Patented Oct. 5, 1926.

1,602,212

UNITED STATES PATENT OFFICE.

JOHN ALEXANDER RITCHIE, OF LONDON, ENGLAND.

COMPOSITION CONTAINING WHEN SET OXYCHLORIDES.

No Drawing. Application filed January 28, 1925, Serial No. 5,284, and in Great Britain February 15, 1924.

This invention relates to the manufacture of oxychloride compositions, usually applied in a mouldable state to the surface to be covered and prepared by mixing together cellular material, such as sawdust, which constitutes, what may be termed, the body ingredient of the composition, calcined magnesite and magnesium chloride solution. The composition may comprise other ingredients adapted to impart hardness, enhanced fire-proofness and other qualities to the composition. For example the ingredients of the composition may include, in addition to the aforesaid essential ingredients, quartz or coke-breeze to impart increased hardness to the composition and asbestos to impart increased fire-proofness. The magnesite and magnesium chloride solution re-act one upon the other in the presence of the body ingredients, and an oxychloride is formed which causes the composition to become a hard coherent mass.

The present invention has for its object to provide an improvement in the manufacture of composition of the above class as compared with the present mode of manufacture of such compositions.

According to the present invention the manufacture of a composition of the type described above is characterized in that the body ingredient, prior to the addition in the composition mixture of one of the re-acting ingredients to the other, is caused to absorb water in amount sufficient to render the body ingredient damp to the touch, but insufficient to produce a pasty condition of the body ingredient, the amount of absorbed water moreover being such that the body ingredient is capable of passing freely through the fingers without depositing water thereon, said body ingredient being admixed with the other ingredients in the aforesaid damp condition.

It is to be understood that the invention relates only to the above well-known class of compositions wherein the hard setting property of the composition is due solely to the formation of magnesium oxychloride, by the interaction, in the presence of a fibrous body ingredient, of magnesium chloride and calcined magnesite added as such to the body ingredient, and that it does not relate to compositions of the class wherein the hard setting property is due to the presence of water-soluble silicates, such as the silicates of sodium and potassium, or to the presence of hard setting resins or gums. I am aware that it has been proposed in compositions of this latter class to moisten wood-pulp with water prior to admixture of the pulp with the hard setting components of the composition. I am also aware that it has been proposed to prepare a composition of the class wherein the hard setting property is due to the formation of magnesium oxychloride in the presence of a cellular body ingredient, such as sawdust, by first impregnating the body ingredient with an aqueous solution of hydrochloric acid and thereafter, with the acid-impregnated body ingredient in a damp and plastic condition, to add powdered calcined magnesite to the body ingredient and intimately mixing the materials together. In this process a part of the calcined magnesite reacted with the hydrochloric acid and formed magnesium chloride, which again reacted with the remainder of magnesite present to form magnesium oxychloride.

The present invention is essentially distinguished from the former of the above two prior proposals in that it relates solely to magnesium oxychloride compositions which depend for their hard setting properties upon the formation of magnesium oxychloride. The difficulty encountered and so successfully met by the present invention presents itself only in such compositions. The present invention is distinguished, moreover, from both of the prior proposals in that the amount of water present in the body ingredient is so controlled that a plastic condition of the said ingredient is avoided, and not only so, but the condition of dampness is such that the body ingredient is capable of passing freely through the fingers without depositing water thereon. I have found there is, what may be termed, a critical condition of dampness, and the present invention is characterized essentially by first bringing the body ingredient to this particular condition of dampness.

The amount of water to be absorbed by the sawdust or other body ingredient, may vary, and will depend upon the nature of the particular material used as the body ingredient. For instance, sawdust may require to absorb about its own weight of water. If wood flour be employed, the proportion of absorbed water may be somewhat less, but in the case of disintegrated cork, the amount of water employed may be as much as one and a half times the weight of the cork.

It has been found that by employing sawdust, or the like, which has been previously damped with water to the condition of dampness aforesaid, the quality of the composition is much improved.

Without limiting the invention by any explanation of why this improvement occurs, it may be stated that the improvement is due partly to pre-expansion or pre-seasoning of the sawdust or other body ingredient before the composition hardens and partly to capillary action of the pores of the damp sawdust upon the magnesite and magnesium chloride solution. If the sawdust be used dry it swells during the hardening of the composition and this tends to militate against closeness and hardness of texture of the composition. Also, the resulting porosity of the composition when the latter set allows dampness to penetrate to a certain extent and this appears to act on the body ingredients of the composition in such a manner as to cause disintegration, and in some cases, cracking.

The capillary action referred to, is very advantageous in that it results in very intimate association of the sawdust with the oxychloride formed during the setting of the composition, oxychloride permeating into the pores of the sawdust. Whatever the explanation may be, the improvement, due to the employment of damp sawdust or the like, is very marked.

The disintegrated material of fibrous or cellular structure may consist of, in addition to, or as an alternative to, sawdust, wood-flour, cane or bamboo dust or disintegrated bark, such as cork.

It has been found preferable first to mix the solid constituents in a "dry" condition and thereafter to continue the mixing with the addition of magnesium chloride solution. It is to be understood of course that the expression "dry" does not mean completely free of moisture, but dry in contrast to the condition resulting from the addition of the magnesium chloride solution.

The following is one method of carrying the invention into effect.

A "dry" mixture is prepared of 4 parts of sawdust, damped with about its own weight of water, 14 parts of calcined magnesite and 4 parts of powdered quartz. These proportions are by weight. To this dry mixture is added sufficient magnesium chloride solution, of about 21° to 23° Bé. density, to result after thorough admixture in a mortar like consistency.

The density of the magnesium chloride solution may be varied as desired up to, say 30° Bé. It is preferably not substantially less than 16° Bé. and not substantially greater than 23° Bé. The proportion by weight, of solution of solid constituents may be about 1:1 but the actual proportions employed will depend upon the nature and proportions of the ingredients.

This plastic composition is laid upon the floor or other surface to be covered and trowelled or otherwise worked to a flat surface. It will be found to set in a few hours so that it may be walked upon. If a comparatively hard surface be required, less sawdust and more of the powdered hard material, such as quartz, may be incorporated. Coke-breeze may also be used to the same end. These harder compositions are particularly valuable in places such as garage floors. If a comparatively soft and light material is required, for example for bedroom and other floorings, more sawdust or wood flour and less of the harder and heavier materials may be employed.

If the surface be such that the plastic composition will not readily adhere, the surface may first be treated by brushing it over with a liquid mulch consisting of a solution of magnesium chloride containing in suspension sawdust and a small amount of calcined magnesite. The amount of sawdust and magnesite is kept sufficiently small to maintain fully the liquid properties of the mulch. The density of the magnesium chloride solution for the mulch may suitably be between 14° and 18° Bé.

If a thick floor is to be laid, composition of comparatively coarse-grained material may first be laid and when this is set the surface, if necessary, is wetted with the liquid mulch and a further coat of finer-grained composition is applied to give a good finishing surface.

A further example of the invention may be given as follows. Wood flour is treated with water until it absorbs sufficient water to render it damp to the touch but still capable of passing through the fingers without depositing water thereon. To 4 parts of this damp wood flour are added 11 or 12 parts of calcined magnesite, 4 parts of asbestos and 6 parts of powdered quartz. These proportions are by weight. The materials are first mixed in a "dry" condition and thereafter a sufficient quantity of aqueous solution of magnesium chloride is added to result, upon thorough mixing, in a mortar-like consistency.

In order to render the composition specially resistant to fire, there may be employed, along with the other ingredients, a naturally occurring insoluble silicate, such as asbestos.

Pigments may be incorporated in the known manner into the composition for the purpose of imparting any desired colour thereto. These may include oxides, earthcolours and red, yellow or brown ochre or any other powdered colouring materials.

Patterns may be worked if desired, into the floor or other surface-covering in the form of an inlay by moulding pieces of the composition in various colours, laying them in place and setting them with plastic composition used as a mortar.

Alternatively, depressions may be formed in the floor by pressing laths into it, while it is plastic, and these depressions can, when the floor is set, be filled with compositions of different colour from that of the flooring, so as to provide an inlay effect.

Instead of the composition being applied in situ it may first be moulded and then applied in solid form, for example, in the form of slabs. If moulded, it is found desirable first to apply oil, or grease, or soft-soap, to the mould surfaces, so as to prevent the composition from sticking to the moulds.

If the plastic composition be mixed with a small quantity of silicate of soda (e. g. commercial water-glass) in addition to the ingredients above set forth, and moulded in sheet-metal moulds which have been previously rubbed with a solution of water-glass, the composition, when set, will turn out with a glazed surface like polished marble, and this is to be understood as a further feature of the present invention.

Composition prepared and applied according to the present invention will form a coherent covering of substantial strength even when laid as thin as one-eighth of an inch and it is not attacked readily by oil, water, fire or vermin. When set the composition can be readily polished and the softer compositions can be planed or otherwise worked like wood. Furthermore, the composition can be sawn and nailed or bored with less tendency to cracking than known compositions. Moreover, it is an excellent heat insulator and can successfully be applied to steam pipes and the like as insulation.

In addition to the substances mentioned the composition may comprise marble dust, marble chippings sand and ground or broken shells, e. g. oyster shells; these substances being used in the composition singly or together either in place of the quartz previously mentioned or in addition thereto. Again talc or mica may be used instead of or in addition to asbestos.

What I claim as my invention and desire to secure by Letters Patent is:—

1. In the manufacture of oxychloride composition containing a body ingredient and reacting ingredients comprising calcined magnesite and magnesium chloride, causing the body ingredient, prior to the addition in the composition mixture of one of the reacting ingredients to the other, to absorb water in amount sufficient to render the body ingredient damp to the touch but insufficient to produce a pasty condition of the body ingredient, the amount of absorbed water, moreover, being such that the body ingredient is capable of passing freely through the fingers without depositing water thereon, said body ingredient being admixed with the other ingredients in the damp condition.

2. In the manufacture of oxychloride composition containing a body ingredient and reacting ingredients comprising calcined magnesite and magnesium chloride, impregnating the body ingredient, prior to the admixture of the body ingredient with the other ingredients of the composition mixture, with an amount of water sufficient to render the body ingredient damp to the touch but insufficient to produce a pasty condition of the body ingredient, the amount of absorbed water, moreover, being such that the body ingredient is capable of passing freely through the fingers without depositing water thereon, and admixing the body ingredient with said other ingredients, in the damp condition.

3. A process of manufacturing oxychloride composition containing a body ingredient of disintegrated wood comprising the steps of impregnating disintegrated wood with an amount of water and sufficient to render the latter damp to the touch but insufficient to produce a pasty condition of the body ingredient, the amount of absorbed water, moreover, being such that the disintegrated wood is capable of passing freely through the fingers without depositing water thereon, and subsequently, while the wood is in the aforesaid water-impregnated condition, intimately mixing it with calcined magnesite and sufficient magnesium chloride solution to result in a consistency suited to the desired mode of application of the composition to the surface to be covered.

4. A process of manufacturing oxychloride composition containing a body ingredient of sawdust comprising the steps of impregnating sawdust with an amount of water sufficient to render the latter damp to the touch but insufficient to produce a pasty condition of the sawdust, the amount of absorbed water, moreover, being such that the sawdust is capable of passing freely through the fingers wthout depositing water thereon, and subsequently, while the sawdust is in the aforesaid water-impregnated condition, intimately mixing it with calcined magnesite and sufficient magnesium chloride solution to result in a consistency suited to the desired mode of application of the composition to the surface to be covered.

5. A process of manufacturing oxychloride composition containing a body ingredient of sawdust comprising the steps of impregnating sawdust with sufficient water so as to render it damp to the touch but still capable of passing freely through the fingers without depositing water thereon, mixing the sawdust in this damp condition with from three to four times its weight of calcined magnesite, and after a thorough mixing of these ingredients has been effected, adding to the mixture sufficient magnesium chloride solution of from 21° to 23° Beaumé density to result, upon continued thorough admixture of the ingredients, in a mortar-like consistency.

In testimony whereof I affix my signature.

JOHN ALEXANDER RITCHIE.